US012373861B2

(12) United States Patent
Xu et al.

(10) Patent No.: US 12,373,861 B2
(45) Date of Patent: Jul. 29, 2025

(54) METHODS AND SYSTEMS FOR CONTENT MANAGEMENT

(71) Applicant: Comcast Cable Communications, LLC, Philadelphia, PA (US)

(72) Inventors: Yushi Xu, Philadelphia, PA (US); Jiuqing Deng, Philadelphia, PA (US); Boyuan Yuan, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/345,880

(22) Filed: Jun. 11, 2021

(65) Prior Publication Data

US 2022/0398627 A1    Dec. 15, 2022

(51) Int. Cl.
*G06Q 30/0241*    (2023.01)
*G06Q 30/0251*    (2023.01)
*H04W 4/23*    (2018.01)

(52) U.S. Cl.
CPC ..... *G06Q 30/0248* (2013.01); *G06Q 30/0264* (2013.01); *H04W 4/23* (2018.02)

(58) Field of Classification Search
CPC ........... G06Q 30/0264; G06Q 30/0248; G06Q 30/0241; G06Q 30/0251; H04W 4/23
See application file for complete search history.

(56) References Cited

U.S. PATENT DOCUMENTS

| | | | |
|---|---|---|---|
| 7,783,753 B2 * | 8/2010 | Shuster | H04L 67/54 709/227 |
| 2010/0135248 A1 * | 6/2010 | Aramaki | H04W 74/0866 370/331 |
| 2017/0098236 A1 * | 4/2017 | Lee | G06Q 10/067 |
| 2017/0323018 A1 * | 11/2017 | Angelova | G06Q 30/0277 |
| 2020/0228876 A1 * | 7/2020 | Gordon | H04N 21/278 |
| 2020/0244758 A1 * | 7/2020 | Enguehard | H04L 65/80 |
| 2022/0132206 A1 * | 4/2022 | Killick | H04N 21/44209 |

* cited by examiner

*Primary Examiner* — Azam A Ansari
(74) *Attorney, Agent, or Firm* — Ballard Spahr LLP

(57) ABSTRACT

Methods and systems for content management are described. If programming content is distributed to viewers, signals are transmitted with the programming content to indicate a segmentation in the programming content. If a user device sees the signal indicating the advertisement break, the use device may make a request to an advertisement server. The advertisement server may receive the request and determine an identifier associated with the request and an identifier associated with an advertisement break. A binder may bind the identifier associated with the request and the identifier associated with the advertisement break.

23 Claims, 9 Drawing Sheets

610 RECEIVE PLURALITY OF REQUESTS FROM PLURALITY OF MEDIA DEVICES

620 RECEIVE REQUEST FROM EDGE DEVICE

630 DETERMINE QUANTITY OF REQUESTS

640 DETERMINE CONTENT INSERTION POINT IDENTIFIER IS VALID

650 CAUSE CONTENT TO BE INSERTED

METHODS AND SYSTEMS FOR CONTENT MANAGEMENT

BACKGROUND

Many of today's entertainment or communication-related electronic devices rely on receiving, sending, and/or using digital data or content. For example, a media device may receive content comprising advertisement break marked with a "marker" as well as marker ID. However, before the content is sent to the media devices, a signal processing component identifies the marker and generates a marker identifier (marker ID) which is passed both to the media devices with the content and also to a binder which associates (e.g., "binds") the marker ID with a particular advertisement break in the content. If there should be any delay in receipt of the marker ID by the binder due to, for example latency, network congestion, or any processing congestion inside the binder, all advertisement requests associated with that marker ID will fail because the advertisement server will not be able to determine which advertisement to send in response to an advertisement request.

SUMMARY

It is to be understood that both the following general description and the following detailed description are exemplary and explanatory only and are not restrictive. Methods and systems for content management are described. Content may be sent to a media device. In order to deliver an advertisement to the media device, the advertisement may be inserted (e.g., "spliced") into an advertisement break in the content. The advertisement break may be associated with a break ID. The advertisement break may be indicated in the content using a marker. In order to timely request an advertisement so as to receive the advertisement at the same time as the advertisement break, the media device may detect the marker before the advertisement break. The marker may cause the media device to send an advertisement request comprising the marker ID, a content ID, a syscode, and a device ID to an advertisement server. The advertisement server may receive the advertisement request and determine an advertisement to serve in response to the advertisement request. The determination of the advertisement to serve may be subject to an advertisement schedule. The advertisement server may determine an advertisement schedule to perform break counting logic. For example, the advertisement server may, based on the advertisement schedule, determine a previously bound advertisement break and may serve, based on the previously bound advertisement break, an advertisement associated with a next unbound advertisement break.

BRIEF DESCRIPTION OF THE DRAWINGS

The accompanying drawings, which are incorporated in and constitute a part of this specification, show examples and together with the description, serve to explain the principles:

FIG. 6 shows a flowchart of an example method for content management;

DETAILED DESCRIPTION

Figure 1A:
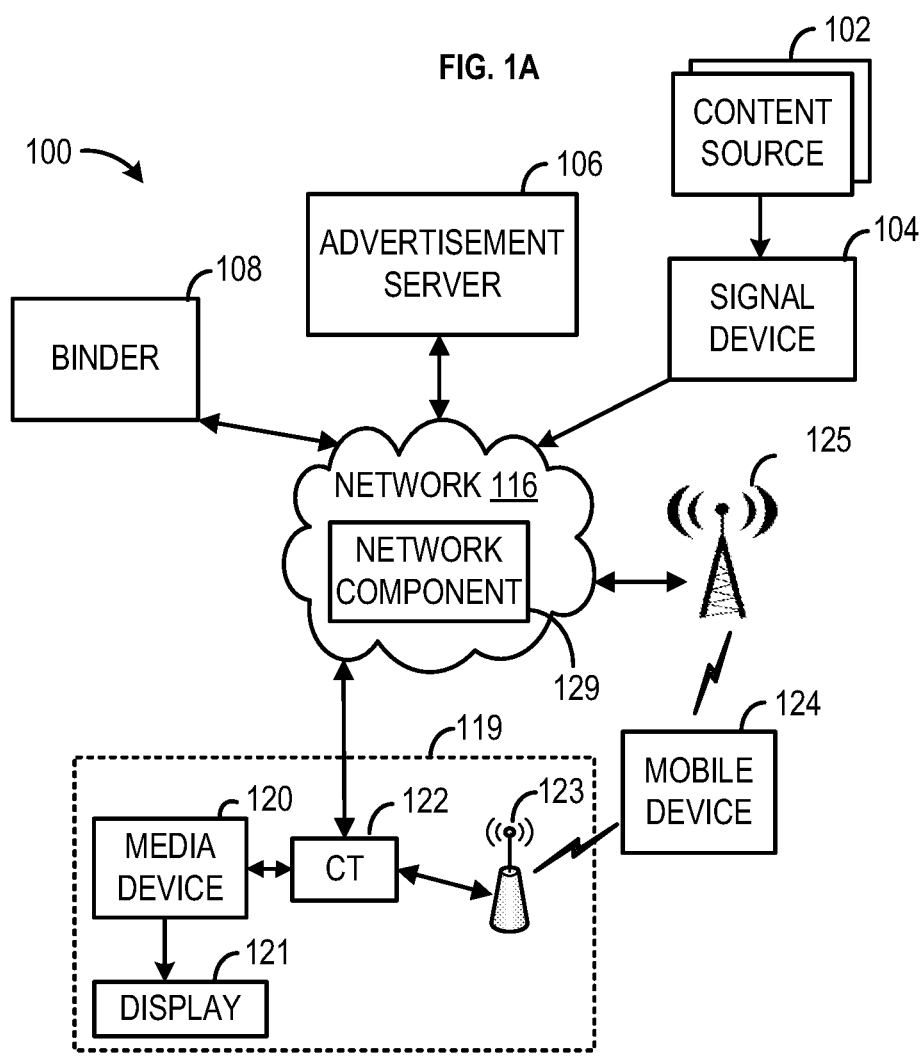
FIGS. 1A-1B show an example system for content management.

As used in the specification and the appended claims, the singular forms "a," "an," and "the" include plural referents unless the context clearly dictates otherwise. Ranges may be expressed herein as from "about" one particular value, and/or to "about" another particular value. If such a range is expressed, another configuration includes from the one particular value and/or to the other particular value. Similarly, if values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is to be understood that if combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information." Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4 k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (0.7PG) format, Portable Network Graphics (.PNG) format, dynamic advertisement insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

FIG. 1 shows a system 100 for content distribution. Those skilled in the art will appreciate that digital equipment and/or analog equipment may be employed. Those skilled in the art will appreciate that provided herein is a functional description and that the respective functions may be performed by software, hardware, or a combination of software and hardware.

The system 100 may comprise a content source 102, a signal device 104, an advertisement server 106, a binder 108, and/or a media device 120. Each of the content source 102, the signal device 104, the advertisement server 106, the binder 108, and/or the media device 120 can be one or more computing devices, and some or all of the functions performed by these components may at times be performed by a single computing device. The content source 102, the signal device 104, the advertisement server 106, the binder 108, and/or the media device 120 may be configured to communicate through a network 116. The network 116 may facilitate sending content from the content source 102 to the media device 120 (or other device) at a user location 119. The network 116 may facilitate sending advertisements from the advertisement server 106 to the media device 120 (or other device) at the user location 119. The network 116 may be a content delivery network, a content access network, combinations thereof, and the like. The network may be managed (e.g., deployed, serviced) by a content provider, a service provider, combinations thereof, and the like. The network 116 may be an optical fiber network, a coaxial cable network, a hybrid fiber-coaxial network, a wireless network, a satellite system, a direct broadcast system, or any combination thereof. The network 116 can be the Internet. The network 116 may have a network component 129. The network component 129 may be any device, module, combinations thereof, and the like communicatively coupled to the network 116. The network component 129 may be a router, a switch, a splitter, a packager, a gateway, an encoder, a storage device, a multiplexer, a network access location (e.g., tap), physical link, combinations thereof, and the like.

The content source 102 may be configured to send content (e.g., video, audio, movies, television, games, applications, data, etc.) to one or more devices such as the signal device 104, a network component 129, a first access point 123, a mobile device 124, a second access point 125, and/or the media device 120. The content source 102 may be configured to send streaming media, such as video on-demand content (e.g., VOD), broadcast content, content recordings, combinations thereof, and the like. The content source 102 may be managed by third party content providers, service providers, online content providers, over-the-top content providers, combinations thereof, and the like. The content may be sent based on a subscription, individual item purchase or rental, combinations thereof, and the like. The content source 102 may be configured to send the content via a packet switched network path, such as via an IP based connection. The content may comprise a single content item, a portion of a content item (e.g., content fragment), a content stream, a multiplex that includes several content items, combinations thereof, and the like. The content may be accessed by users via applications, such as mobile applications, television applications, STB applications, gaming device applications, combinations thereof, and the like. An application may be a custom application (e.g., by content provider, for a specific device), a general content browser (e.g., web browser), an electronic program guide, combinations thereof, and the like.

The content may comprise signaling data. The signaling data may be inserted into the content at the content source 102. The signaling data may be inserted by the content source 102 in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The signaling data may comprise one or more markers. For example, the signaling data may comprise Society of Cable and Television Engineers 35 (SCTE-35) markers. The Society of Cable Telecommunications Engineers 35 (SCTE35) is hereby incorporated by reference in its entirety. The Society of Cable Telecommunications Engineers 30 (SCTE30) and the Society of Cable Telecommunications Engineers 130 (SCTE130) are also hereby incorporated by reference in their entirety. The one or more markers may be associated with one or more advertisement breaks. For example, the one or more markers may precede and/or trail the one or more advertisement breaks in the content. For example, the one or more markers may indicate that an advertisement break of the one or more advertisements breaks is inbound (e.g., upcoming in the content). The one or more advertisements breaks may be associated with one or more advertisement insertion points. The one or more advertisement insertion points may indicate an opportunity to insert an advertisement into the content at the advertisement break. The one or more advertisement insertion points may be referred to as, and/or associated with, advertisement insertion opportunities. For example, the one or more markers may be utilized to mark timestamps of events such as the one or more advertisement insertion points. For example, the one or more markers may indicate to a device which receives the one or more markers (e.g., the signal device 102 and/or the media device 120), that an advertisement break in the content is upcoming (e.g., "inbound") within a period of time (e.g., 2 seconds, 10 seconds, etc. . . . ).

The signal device 104 may receive the content. The signal device 104 may process the content and determine the signaling data as is known in the art. For example, the signal device 104 may receive the content comprising the one or more markers and determine a marker of the one or more markers. For example, the signal device 104 may parse SCTE-35 messages carried within an MPEG transport stream of the content. For example, the signal device 104 may determine an XML namespace prefix identifying the marker as an SCTE-35 marker. For example, the signal device 104 may identify a cue_identifier_descriptor and/or a cue_stream_type value associated with the marker such as "splice_insert" "splice_null," "splice_schedule" combinations thereof, and the like. The signal device 104 may determine, based on the marker, a unique marker identifier (marker ID). The marker ID may be a content insertion point identifier associated with a content insertion opportunity. The content insertion opportunity may comprise an opportunity to insert, into a content stream, content such as an advertisement or other content. For example, the signal device 104 may generate the marker ID based on the time at which the signal device 104 determined the marker. The signal device 104 may send, to the media device 120, the marker ID. The marker ID may be sent to the media device 120 along with the content (e.g., from the content source 102). The marker ID may be sent to the media device 120 separate from the content. The marker ID may be sent to the media device 120 in a data packet. For example, the marker ID may be inserted, by the signal device 104, into the SCTE-35 marker. The marker ID may be sent to the media device 120 at the same time as the content. The marker ID may arrive at the media device 120 at approximately the same time as the marker in the content arrives at the media deice 120.

The media device 120 may receive the content. The media device 120 may comprise a user device such as an STB, computer, mobile phone, combinations thereof, and the like. The media device 120 may be a digital streaming device, a gaming device, a media storage device, a digital recording device, a computing device, a mobile computing device (e.g., a laptop, a smartphone, a tablet, etc.), combinations thereof, and the like. The media device 120 may determine the marker in the content. For example, the media device 120 may parse the SCTE-35 messages carried within the MPEG transport stream of the content. For example, the media device 120 may determine the XML namespace prefix identifying the marker as an SCTE-35 marker. For example, the media device 120 may identify a cue_identifier_descriptor and/or a cue_stream_type value associated with the marker such as "splice_insert" "splice_null," "splice_schedule" combinations thereof, and the like. A person skilled in the art will appreciate that the aforementioned examples are non-limiting. The media device 120 may be configured to receive the marker ID. For example, the media device 120 may receive the data packet comprising the marker ID. The marker ID may comprise a string of letters, numbers, symbols, combinations thereof, and the like. For example, the data packet may comprise a notification packet. An example of a part of the notification packet is shown below:

```
{
  "Notification": {
    "cluster": "Herald Production Ashburn (2.1.2)",
    "id": "ab9d045b-4558-4e58-a22b-646b56bdbb95",
    "payload": {
      "SignalNotification": {
        "acquistionInfo": {
          "id": "Envivio-5291224573784928163",
          "ipv4": "10.144.129.42"
          "utcTime": "2020-07-26T03:08:12.629Z"
```

The media device 120 may determine the marker ID. In the example of the part of the notification packet, the marker ID may be "ab8d045b-4558-4e58-a22b-646b56bdbb95." The media device 120 may determine a timestamp associated with the marker and/or the marker ID (e.g., a marker timestamp). For example, the marker timestamp in the above is "2020-07-26T03:08:12.629Z." Based on receiving the marker, the media device 120 may send an advertisement request to the advertisement server 106. The advertisement request may comprise at least one of the marker ID, the marker timestamp, a media device ID, and/or a content ID. The media device ID may comprise a unique identifier associated with the media device 120. For example, the media device ID may comprise a MAC address. The MAC address may be associated with a geographic ID (e.g., a "syscode"). The syscode may comprise a four digit code determined by National Cable Communications (NCC) to represent a specific geography available for advertisement insertion. The syscode may represent a specific geographic zone, grouping of zones, a cable interconnect or grouping of cable interconnects, combinations thereof, and the like. The content ID may comprise a unique ID associated with the content. For example, the content ID may comprise at least one of a channel ID, a frequency ID, a content title, a television network name, combinations thereof, and the like.

Similarly, the second access point 125 may receive the content. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park). The second access point 125 may comprise a video delivery edge device (e.g., a "VDE"). The VDE may comprise, for example, a gateway. The media device 120 may be a digital streaming device, a gaming device, a media storage device, a digital recording device, a computing device, a mobile computing device (e.g., a laptop, a smartphone, a tablet, etc.), combinations thereof, and the like. The second access point 125 may determine the marker in the content. For example, the second access point 125 second access point 125 may parse the SCTE-35 messages carried within the MPEG transport stream of the content. For example, the second access point 125 may determine the XML namespace prefix identifying the marker as an SCTE-35 marker. For example, the second access point 125 may identify a cue_identifier_descriptor and/or a cue_stream_type value associated with the marker such as "splice_insert" "splice_null," "splice_schedule" combinations thereof, and the like. A person skilled in the art will appreciate that the aforementioned examples are non-limiting. The second access point 125 may be configured to receive the marker ID. For example, the second access point 125 may receive the data packet comprising the marker ID. The marker ID may comprise a string of letters, numbers, symbols, combinations thereof, and the like. For example, the data packet may comprise a notification packet. An example of a part of the notification packet is shown below:

```
{
  "Notification": {
    "cluster": "Herald Production Ashburn (2.1.2)",
    "id": "ab9d045b-4558-4e58-a22b-646b56bdbb95",
    "payload": {
      "SignalNotification": {
        "acquistionInfo": {
          "id": "Envivio-5291224573784928163",
          "ipv4": "10.144.129.42"
          "utcTime": "2020-07-26T03:08:12.629Z"
```

The second access point 125 may determine the marker ID. In the example of the part of the notification packet, the marker ID may be "ab8d045b-4558-4e58-a22b-646b56bdbb95." The second access point 125 may determine a timestamp associated with the marker and/or the marker ID (e.g., a marker timestamp). For example, the marker timestamp in the above is "2020-07-26T03:08:12.629Z." Based on receiving the marker, the second access point 125 may send an advertisement request to the advertisement server 106. The advertisement request may comprise at least one of the marker ID, the marker timestamp, a VDE ID, and/or a content ID. The VDE ID may comprise a unique identifier associated with the second access point 125. For example, the VDE ID may comprise a MAC address. The MAC address may be associated with a geographic ID (e.g., a "syscode"). The syscode may comprise a four digit code determined by National Cable Communications (NCC) to represent a specific geography available for advertisement insertion. The syscode may represent a specific geographic zone, grouping of zones, a cable interconnect or grouping of cable interconnects, combinations thereof, and the like. The content ID may comprise a unique ID associated with the content. For example, the content ID may comprise at least one of a channel ID, a frequency ID, a content title, a television network name, combinations thereof, and the like. The VDE (and by extension, the VDE ID) may be associated with a plurality of media devices. For example, the VDE ID may be associated with a plurality of media devices in a geographic region. The advertisement request may indicate a quantity of media device in the geographic region. For example, the advertisement request from the VDE may indicate that the VDE serves 1,000 thousand media devices within the geographic region.

Figure 1B:
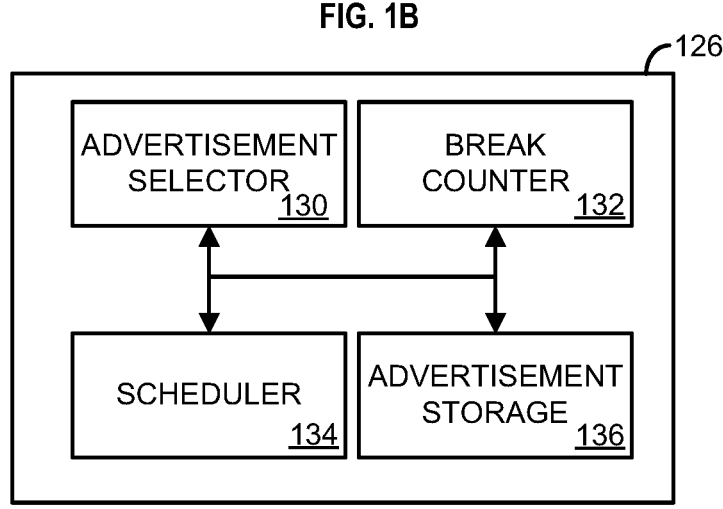

The advertisement server 106 may receive the advertisement request. The advertisement server 106 may comprise one or more computing devices (e.g., servers) configured to store, cause storage, determine, cause determination, send, and/or cause sending of one or more advertisements. As shown in FIG. 1B, the advertisement server 126 may comprise an advertisement selector 130, a break counter 132, a scheduler 134, and advertisement storage 136. The advertisement server 106 may receive the advertisement request from the media device 120. The advertisement server 106 may receive a plurality of advertisement requests. The advertisement server 106 may receive the plurality of advertisements requests from a plurality of media devices. Each advertisement request of the plurality of advertisement requests may comprise an advertisement request timestamp. The advertisement request timestamp may indicate when a given media device (e.g., the media device 120) of the plurality of media devices sent the advertisement request. If the advertisement server 106 receives the plurality of advertisement requests, for each advertisement request of the plurality of advertisement requests, the advertisement server may determine at least one of the marker ID, the content ID, the advertisement request timestamp, and the media device ID. The break counter 132 may perform break counting logic. The break counting logic may comprise a series of steps (e.g., actions) executed by the break counter 132 in order to determine a current advertisement insertion point. The break counter 132 may determine a previous advertisement insertion point associated with a previous plurality of advertisement requests. For example, the break counter 132 may query the scheduler 134 to determine an advertisement schedule. The advertisement schedule may comprise one or more advertisement breaks. Each advertisement break of the one or more advertisement breaks may be associated with an advertisement break timestamp and an advertisement break ID. The one or more advertisement breaks may comprise one or more previous advertisement breaks. Each previous advertisement break of the one or more previous advertisement breaks may be associated with a previous advertisement break ID and a previous advertisement break timestamp. The previous advertisement break ID may be associated with a previous marker ID received in the previous plurality of advertisement requests. The previous advertisement break ID may be associated with a previous advertisement insertion point (e.g., a previous advertisement break) and a previous marker ID. The break counter 132 may determine, based on the association of the previous advertisement break ID and the previous marker ID, that the previous advertisement break ID is "bound" to the previous marker ID. Based on determining that the previous advertisement break ID and the previous marker ID are bound, the break counter 132 may determine the next unbound advertisement break ID is the current advertisement break ID and thereby, the break counter 132 may determine the current advertisement break ID is associated with the marker ID indicated in the plurality of advertisement requests. The current advertisement break ID may be an advertisement break ID which is sequentially and/or temporally "next" after the previous advertisement break ID (e.g., the "bound" advertisement break ID). Likewise the marker ID may comprise a marker ID which is temporally and/or sequentially "next" after the previous marker ID (e.g., the "bound" marker ID. That is to say, upon receiving the plurality of advertisement requests, the break counter 132 may determine the previous advertisement break ID, the previous advertisement break timestamp, the previous marker ID, and, based on the previous advertisement break ID, the previous advertisement break timestamp, the previous marker ID, and the current advertisement request timestamp, determine that the marker ID in the plurality of advertisement requests is associated with the current advertisement break ID. The break counter 132 may "bind" the marker ID in the plurality of advertisement requests to the current advertisement break ID.

For example, a first marker ID in the content may comprise a unique identifier. For example, the marker ID may be AAAAA1. If the marker ID AAAAA1, and a content ID 001 (for example, associated with the CNN channel) is received by the advertisement server 106, the break counter 132 may perform break counting logic to identify the next available advertisement break in CNN schedules. For example, in the above, if no advertisement break in a schedule has been bound, and the advertisement server 106 receives marker ID AAAAA1, the binder 108 will bind marker ID AAAAA1 to advertisement break ID 10001 (CNN-New York) and also bind marker ID AAAAA1 to advertisement break ID 20001 (CNN-Boston). Thus, the advertisement schedules for CNN-New York and CNN-Boston may be updated as below, where the "Marker ID" field being populated indicates the marker ID in the Marker ID field has been bound to the advertisement break ID in the Break ID field and the "null" designation in the "Marker ID" field indicates an unbound advertisement break ID (e.g., the "next unbound" advertisement break):

| Break ID | Spots | Marker ID |
|---|---|---|
| CNN-New York (1001) | | |
| 10001 | Spot1 (Coke) | AAAAA1 |
| | Spot2 (Ford) | |
| 10002 | Spot3 (Coke) | null |
| | Spot4 (P&G) | |
| | Spot5 (Dell) | |
| CNN-Boston (1002) | | |
| 20001 | Spot6 (Sony) | AAAAA1 |
| | Spot7 (P&G) | |
| 20002 | Spot8 (Oreo) | null |
| | Spot9 (Pet food) | |
| | Spot10 (Nissan) | |

The advertisement server 106 may receive a second marker ID. For example, the second marker ID may comprise a unique identifier. For example, the second marker ID may be BBBBB2. If the second marker ID BBBBB2, and the content ID 001 (for CNN) is received by the advertisement serer 106, the break counter 132 may perform the break counting logic to identify the next available advertisement break in the CNN schedules. For example, in the above, if the first advertisement break in the schedule has been bound, and the advertisement server 106 receives marker ID BBBBB2, the break counter will determine the next advertisement break is 10002 in New York (as indicated by "null"), and 20002 in Boston (as indicated by "null"). The advertisement server 106 may send this information to the binder 108. For example, upon receiving the advertisement request (or a plurality of advertisement requests), the advertisement server 106 may send a message to the binder 108. The binder 108 may be configured to receive the message. The message may comprise the information associated with the advertisement request. For example, the message may comprise at least one of the marker ID, the media device ID, the content ID, and/or the break ID. Based on receiving the message, the binder may associate the break ID to the marker ID in a database. For example, the binder 108 may bind the second marker ID BBBBB2 to advertisement break 10002 (CNN-New York) and also bind the second marker ID BBBBB2 to advertisement break 20002 (CNN-Boston). Thus, the advertisement schedules for CNN-New York and CNN-Boston may be updated as below, where the "Bound Marker ID" field being populated indicates the marker ID in the Marker ID field has been bound to the advertisement break ID in the Break ID field:

| Break ID | Spots | Bound Marker ID |
|---|---|---|
| CNN-New York: | | |
| 10001 | Spot1 (Coke) | AAAAA1 |
| | Spot2 (Ford) | |
| 10002 | Spot3 (Coke) | BBBBB2 |
| | Spot4 (P&G) | |
| | Spot5 (Dell) | |
| CNN-Boston | | |
| 20001 | Spot6 (Sony) | AAAAA1 |
| | Spot7 (P&G) | |
| 20002 | Spot8 (Oreo) | BBBBB2 |
| | Spot9 (Pet food) | |
| | Spot10 (Nissan) | |

The binder 108 may be configured to perform signal protection. Signal protection may refer to binding the marker ID to the advertisement break ID only after a certain quantity of advertisement requests containing the same content ID and marker ID have been received within a time period (e.g., within 10 seconds of each other). For example, the advertisement server 106 may receive 100,000 requests within 10 seconds. The advertisement server 106 may forward, to the binder 108 the marker ID, the content ID, and the timestamp of each advertisement request. The binder may determine that 999,990 of the advertisement requests contain the same marker ID, the same content ID, and all of the timestamps fall within a 10 second window. Therefore, the binder 108 may bind the marker ID to the advertisement break ID. Similarly, when an advertisement request originates at the VDE, the advertisement request may indicate a plurality of media devices associated with the VDE. For example, the advertisement server 106 may receive a plurality of requests for advertisement content. The plurality of requests may originate from a plurality of media devices (e.g., STBs) and a computing device (e.g., the VDE). Each of the plurality of requests for advertisement content may comprise the content marker ID (e.g., the content insertion point identifier). A first request of the plurality of requests may comprise a computing device identifier associated with the computing device (e.g., the VDE) and one or more second requests may comprise an identifier associated with an STB. For example, the advertisement request from the VDE may indicate that the VDE is associated with 50,000 media devices and thus, when the advertisement server receives an advertisement request from a VDE indicated the VDE is associated with 50,000 media devices, the advertisement server may weight the advertisement request from the VDE as 50,000 individual requests from 50,000 individual media devices. Similarly, based on receiving the request comprising the computing device identifier associated with the VDE, the advertisement server 106 (or some other device) may determine (e.g., via querying a database), a request value and a weighting value to apply to the request from the VDE. The request value may comprise a total number of requests. For example, the advertisement server may determine a total number of requests (the one or more second requests from individual STBs and the single request from the VDE). For example, the request value may be a sum of the single request from the VDE and 10,000 requests from individual STBs. Thus the request value would be 10,001. However, upon determining that the VDE is associated with 50,000 STBs, the request value may be updated to indicate that 60,000 ads will be served and thus update the request value to 60,000. The aforementioned is merely exemplary and explanatory and a person skilled in the art will appreciate that any percentage and/or any timeframe may be used. The binder 108 may determine whether the quantity of advertisement requests comprising the same marker ID and content ID satisfies a threshold. The threshold may comprise a percentage threshold. For example, the threshold may comprise a certain percentage of the advertisement requests received during a time period that contain the identifier. For example, if ninety percent of the advertisement requests comprise the same marker ID the threshold may be satisfied. The aforementioned example is not limiting and a person skilled in the art would understand that the threshold may be associated with any value. The quantity of advertisement requests containing the same marker ID may be associated with an absolute quantity (e.g., a threshold quantity), or a relative quantity or percentage. The absolute threshold may comprise an absolute quantity of advertisement requests received which all contain the same marker ID and/or content ID. The relative threshold may indicate how a quantity of advertisement requests received with a particular marker ID and content ID compare to the quantity of advertisement requests received containing other marker IDs and/or content IDs. Determining whether the absolute threshold and/or relative threshold are satisfied may comprise implementing a statistical model to determine if at any given time on a given channel, the advertisement requests received with marker IDs indicate a valid advertisement break happened. The statistical model may indicate low viewership, corrupted data, manual or automatic tests, malicious attacks, historical break distribution patterns, signal patterns, combinations thereof, and the like.

The advertisement server 106 may send the advertisement in response to receiving the advertisement request from the media device 120. The media device 120 may receive the advertisement from the advertisement server 106. The media device 120 may comprise a splicer and in this case, the advertisement server 106 may send the advertisement to the media device 120 via the network 116 with instructions to splice the advertisement into the content at the advertisement insertion point. The media device 120 may splice the advertisement into the content based on the instructions. The content source 102 may comprise the splicer and in this case, the advertisement server may send the advertisement receive the content and splice the advertisement into the content before delivery to the media device 120. The aforementioned examples are merely explanatory and a person skilled in the art will appreciate that the splicer may be at any of the devices of the system 100. The media device 120 may cause output of the advertisement. The advertisement may be output to enable one or more viewers (e.g., the viewers of the user location 119) to watch the advertisement. The advertisement may be displayed via the display device 121.

Returning to the components of system 100, the network 116 may comprise a network component 129. The network component 129 may be any device, module, combinations thereof, and the like communicatively coupled to the network 116. The network component 129 may also be a router, a switch, a splitter, a packager, a gateway, an encoder, a storage device, a multiplexer, a network access location (e.g., tap), physical link, combinations thereof, and the like.

The media device 120 may comprise a demodulator, decoder, frequency tuner, combinations thereof, and the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may implement one or more applications, such as content viewers, social media applications, news applications, gaming applications, content stores, electronic program guides, combinations thereof, and the like. Those skilled in the art will appreciate that the signal may be demodulated and/or decoded in a variety of equipment, including the communication terminal 122, a computer, a TV, a monitor, or a satellite dish. The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), combinations thereof, and the like. The communication terminal 122 may be configured for communication with the network 116 via a variety of protocols, such as IP, transmission control protocol, file transfer protocol, session initiation protocol, voice over IP (e.g., VoIP), combinations thereof, and the like. The communication terminal 122, for a cable network, may be configured to facilitate network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to facilitate access to the network 116 to devices configured with a compatible wireless radio, such as a mobile device 124, the media device 120, the display device 121, or other computing devices (e.g., laptops, sensor devices, security devices). The first access point 123 may be associated with a user managed network (e.g., local area network), a service provider managed network (e.g., public network for users of the service provider), combinations thereof, and the like. It should be noted that in some configurations, some or all of the first access point 123, the communication terminal 122, the media device 120, and the display device 121 may be implemented as a single device.

The user location 119 is not necessarily fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, combinations thereof, and the like. The mobile device 124 may communicate with a variety of access points (e.g., at different times and locations or simultaneously if within range of multiple access points), such as the first access point 123 or the second access point 125.

The system 100 may interface with other systems. For example, the system 100 may comprise a binding database. The binding database may be stored on the advertisement server 106. The binding database may be stored at the binder 108. A person skilled in the art will appreciate that the aforementioned are merely exemplary and explanatory and that the binding database may be stored at any component of the system 100. The binding database may contain data related to receiving advertisement requests and subsequent delivery of the requested advertisement. The data in the binding database may be used by content providers, service providers, or other parties to optimize content delivery. For example, just as the advertisement server 106 may determine the quantity of advertisement requests satisfies the threshold, the advertisement server 106 may also determine the quantity of advertisement requests fails to satisfy the threshold. Likewise, the advertisement server 106 may determine an anticipated quantity of advertisement requests and determine the quantity of received advertisement requests is different than the anticipated quantity of advertisement requests. This type of information may be used to optimize the system 100 for content delivery. For example, if the quantity of advertisement requests received is less than the anticipated quantity of requests, the advertisement server 106 may determine there is a problem with components of the system 100 associated with either the transmission or reception of advertisement requests.

Figure 2:
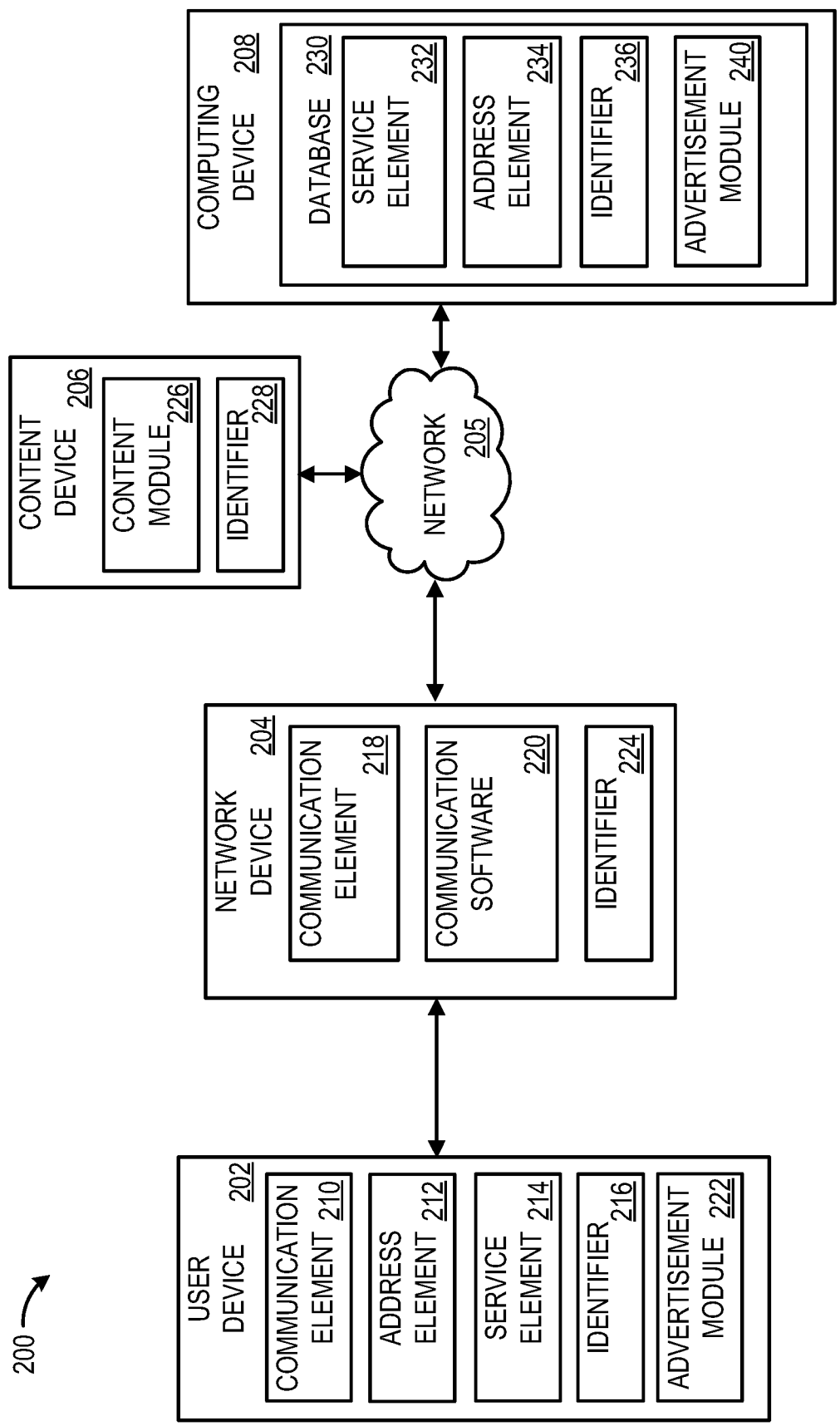
FIG. 2 show an example system for content management.

FIG. 2 shows an example system 200. The system 200 may comprise a user device 202, a network device 204, a network 205, a content device 206, and a computing device 208. The user device 202 may comprise, for example, the media device 120 and/or the mobile device 124 of FIG. 1. The content device 206 may comprise the content source 102 of FIG. 1. The computing device 208 may comprise the advertisement server 106 of FIG. 1. The user device 202 may communicate with the content device 206 and/or the computing device 208 via the network device 204 and the network 205.

The user device 202 may comprise a communication element 210, an address element 212, a service element 214, an identifier 216, and an advertisement module 222. The user device 202 may be an electronic device such as a computer, a smartphone, a laptop, a tablet, an STB, a display device, or other device (e.g., the media device 120, the display 121, the communication terminal 122, and/or the mobile device 124) capable of communicating with a network device 204. The communication element 210 may be a wireless transceiver configured to transmit and receive wireless communications via a wireless network (e.g., Wi-Fi). The communication element 210 may be configured to communicate via one or more wireless networks. The communication element 210 may be configured to communicate via a specific network protocol. The user device 202 may communicate with the network device 204 via the communication element 210. The communication element 210 may be configured to receive content.

The user device 202 may comprise an address element 212 and a service element 214. The address element 212 may comprise an IP address, a network address, a media access control (MAC) address, an Internet address, or the like. The address element 212 facilitate a communication session between the user device 202 and the network device 204 or other devices and/or networks. The address element 212 may be used as an identifier or locator of the user device 202. The address element 212 may be persistent for a particular network.

The service element 214 may comprise an identification of a service provider associated with the user device 202 and/or with a class of user device 202. The class of the user device 202 may be related to a type of device, capability of device, type of service being provided, and/or a level of service (e.g., business class, service tier, service package, etc.). The service element 214 may comprise information relating to a communication service provider (e.g., Internet service provider) that may enable data flow such as communication services to the user device 202. The service element 214 may comprise information relating to a preferred service provider for one or more particular services relating to the user device 202. The address element 212 may be used to identify or retrieve data from the service element 214, or vice versa. The one or more of the address element 212 and the service element 214 may be stored remotely from the user device 202. Other information may be represented by the service element 214.

The user device 202 may be associated with a user identifier or device identifier 216. The device identifier 216 may be any identifier, token, character, string, or the like, for differentiating one user or computing device (e.g., the computing device 208) from another user or computing device. The device identifier 216 may identify a user or computing device as belonging to a particular class of users or computing devices. The device identifier 216 may comprise information relating to the user device 202 such as a manufacturer, a model or type of device, a service provider associated with the user device 202, a state of the user device 202, a locator, and/or a label or classifier. Other information may be represented by the device identifier 216. The device identifier 216 may be assigned to the user device 202 by the network device 204 and/or the computing device 208.

The content device 206 may comprise content module 226 and an identifier 228. The content device 206 may be configured to send content (e.g., via the network 205) to, for example, the user device 202. The content device 206 may also send data (e.g., the one or more markers) associated with the content. The content device 206 may send the data to the user device 202 via the network 205. The identifier 228 may be or relate to an IP Address IPV4/IPV6 or a media access control address (MAC address) or the like. The identifier 228 may be a unique identifier for facilitating wired and/or wireless communications with the network device 204. The identifier 228 may be associated with a physical location of the network device 204.

The user device 202 may be configured to receive the content. The advertisement module 222 may be configured to determine information associated with the content. For example, the advertisement module 222 may be configured to process the signaling data such as the SCTE35 or SCTE30 markers in the content. For example, the advertisement module 222 may be configured to determine a marker associated with an advertisement insertion point. For example, the advertisement module may determine the advertisement insertion point based on a pre-roll warning in the content. The pre-roll warning may contain information which may indicate that the advertisement insertion point is inbound. For example, the pre-roll warning may indicate that a next content segment comprises the advertisement insertion point and therefore, the user device 202 (e.g., the media device 120) may send an advertisement request to the computing device 208 (e.g., the advertisement server 106) so that the requested advertisement may be received by the time the advertisement break arrives. The user device 202 may send the advertisement request to the computing device 208 via the network device 204. Likewise, the computing device 208 may send the requested advertisement to the user device via the network device 204. The advertisement request may comprise the address element 212 and the identifier 216. The user device 202 may be configured to receive the advertisement (e.g., via the network 205) and output and/or cause output of (e.g., via a display device) the received advertisement.

The network device 204 may comprise a communication element 218, communication software 220, and an identifier 224. The network device 204 may be configured as a local area network (LAN). The network device 204 may be a wireless communication device. The network device 204 may be a gateway device for communicating with another network, such as a communication network associated with an Internet Service Provider. The network device 204 may be configured with a first service set identifier (SSID) (e.g., associated with a user network or private network) to function as a local network for a particular user or users. The network device 204 may be configured with a second SSID (e.g., associated with a public/community network or a hidden network) to function as a secondary network or redundant network for connected communication devices. The network device 204 may be configured to allow one or more wireless devices to connect to a wired and/or wireless network using Wi-Fi, Bluetooth or any desired method or standard.

The network device 204 may comprise communication software 220. The communication software 220 may be any combination of firmware, software, and/or hardware. The communication software 220 may facilitate the network device 204 communicating with the user device 202 and/or the computing device 208. For example, the network device 204 may facilitate the user device communicating with the network 205. That is, the user device 202 may communicate with the network 205 via the network device 204.

The communication element 218 may be a wireless transceiver configured to transmit and receive wireless communications via a wireless communication protocol. The communication element 218 may be configured to communicate via a specific network protocol. The communication element 218 may be a wireless transceiver configured to communicate via a Wi-Fi network. The network device 204 may communicate with the user device 202 and/or the computing device 208 via the communication element 218.

The network device 204 may comprise an identifier 224. The identifier 224 may be or relate to an IP Address IPV4/IPV6 or a media access control address (MAC address) or the like. The identifier 224 may be a unique identifier for facilitating wired and/or wireless communications with the network device 204. The identifier 224 may be associated with a physical location of the network device 204.

The computing device 208 may comprise a database 230, a service element 232, an address element 234, an identifier 236, viewing data 238, and advertising module 240. The computing device 208 may manage the communication between the user device 202 and a database 230 for sending and receiving data there between. The database 230 may store a plurality of files (e.g., advertisements, content, web pages), user identifiers or records, or other information. The user device 202 may request and/or retrieve a file from the database 230. The database 230 may store information relating to the user device 202 such as the address element 212 and/or the service element 212. The computing device 208 may obtain the device identifier 216 from the user device 202 and retrieve information from the database 230. The computing device 208 may assign the identifier 216 to the user device 202. Any information may be stored in and retrieved from the database 230. The database 230 may be disposed remotely from the computing device 208 and accessed via direct or indirect connection. The database 230 may be integrated with the computing device 208 or some other device or system.

The computing device 208 may comprise a service element 232. The service element 232 may comprise an identification of a service provider associated with the computing device 208 and/or with the class of computing device 208. The class of the computing device 208 may be related to a type of device, capability of device, type of service, and/or a level of service (e.g., business class, service tier, service package, etc.). The service element 232 may comprise information relating to a communication service provider (e.g., Internet service provider) that may be enabling data flow such as communication services to the computing device 208. The service element 232 may comprise information relating to a preferred service provider for one or more particular services relating to the computing device 208. Other information may be represented by the service element 232.

The address element 234 may comprise an IP address, a network address, a media access control (MAC) address, an Internet address, or the like. The address element 234 may be relied upon to establish a communication session between the computing device 208 and the network device 204 or other devices and/or networks. The address element 234 may be used as an identifier or locator of the computing device 208. The address element 234 may be persistent for a particular network.

The computing device 208 may comprise an identifier 236. The identifier 236 may be or relate to an IP Address IPV4/IPV6 or a media access control address (MAC address) or the like. The identifier 236 may be a unique identifier for facilitating wired and/or wireless communications with the network device 204. The identifier 236 may be associated with a physical location of the computing device 208.

The computing device 208 may store data in the database 230. The data may indicate one or more characteristics of the devices. The data may indicate one or more content items accessed (e.g., watched, output, etc.) by the user device 202. The viewing data may comprise additional data related to the viewing of content items.

The computing device 208 may be configured to receive the advertisement request from the user device 202. The computing device 208 may be configured to send, based on the advertisement request, an advertisement to the user device 202. The computing device 208 may send the advertisement to the user device 202 via the network 116 with instructions to splice the advertisement into the content at the advertisement insertion point. The advertisement may be spliced into the content upstream of the media device 120. For example, the advertisement may be spliced into the content at the content source 102. The user device 202 may receive the content from the computing device 208.

Upon receiving the advertisement request, the computing device 208 may determine at least one of the marker ID, the content ID, and the device ID associated with the advertisement request. The computing device 208 may be configured to execute the break counting logic. Based on the marker ID and the content ID, the computing device 208 may determine the content into which the requested advertisement is to be inserted. For example, in the advertisement request, the content ID may be associated with CNN and the device ID may be associated with a particular STB located in, for example, a particular geographic region (e.g., determined based on a syscode). The device ID may be associated with the user location (e.g., user location 119). The computing device 208, upon receiving the advertisement request and determining the content ID, may determine an advertisement schedule associated with the content ID. The advertisement schedule may be stored in the advertisement module 240 in the database 230. The advertisement schedule may be associated with a time window. For example, the advertisement schedule may comprise content (e.g., advertisements) to be inserted into the CNN content during the time window from 4:00 PM to 5:00 PM. The advertisement schedule may be associated with a geographic region. For example, the advertisement schedule may be associated with a particular city, county, state, or other geographic region. For example, the advertisement schedule associated with the content ID for CNN may comprise different content based on the geographic location of the destination of the content.

The computing device 208 may be configured to receive a plurality of advertisement requests. For example, the computing device 208 may be configured to receive the plurality of advertisement requests from a plurality of user devices. The plurality of advertisement requests may arrive at the computing device at approximately the same time. For example, at the same time or within a time range (e.g., within 2 seconds of each other, within 10 seconds of each other, etc). Each advertisement request of the plurality of advertisement requests may comprise at least one of the marker ID, the content ID and/or a device ID associated with a destination user device (e.g., the media device 120 located at the user location 119). Upon receiving the plurality of advertisement requests, the computing device 208 may determine the content ID contained in the plurality of advertisement requests. Based on the content ID contained in the plurality of advertisement requests, the computing device 208 may determine the advertisement schedule associated with the content ID. The computing device 208 may determine a previous advertisement break associated with a previous plurality of advertisement requests. Based on the previous advertisement break, the computing device 208 may determine a current advertisement break associated with the plurality of advertisement requests. The current advertisement break may be associated with an advertisement break ID which is sequentially "next" after the previous advertisement break ID. Upon receiving the plurality of advertisement requests, the computing device 208 may determine the previous advertisement break ID, and based on the previous advertisement break ID, determine the plurality of advertisement requests are associated with the current advertisement break.

The computing device 208 may determine whether a quantity of advertisement requests comprising the same marker ID satisfies a threshold. The threshold may comprise a percentage threshold. For example, the threshold may comprise a certain percentage of the advertisement requests received during a time period comprise the same marker ID. For example, if ninety percent of the advertisement requests comprise the same marker ID, the threshold may be satisfied. The aforementioned example is not limiting and a person skilled in the art would understand that the threshold may be associated with any value. The threshold may comprise a majority threshold. For example, the threshold may be satisfied if a majority of the advertisement requests comprise the identifier.

Upon receipt of the advertisement, the user device 202 may send to the computing device 208 a confirmation message which may indicate that the advertisement was received. The user device 202 may cause output of the advertisement. The advertisement may be output to enable one or more viewers (e.g., the viewers at the user location 119) to watch the advertisement. The user device 202 may determine whether the advertisement item was output. The user device 202 may send a notification indicating the advertisement was output.

Figure 3:
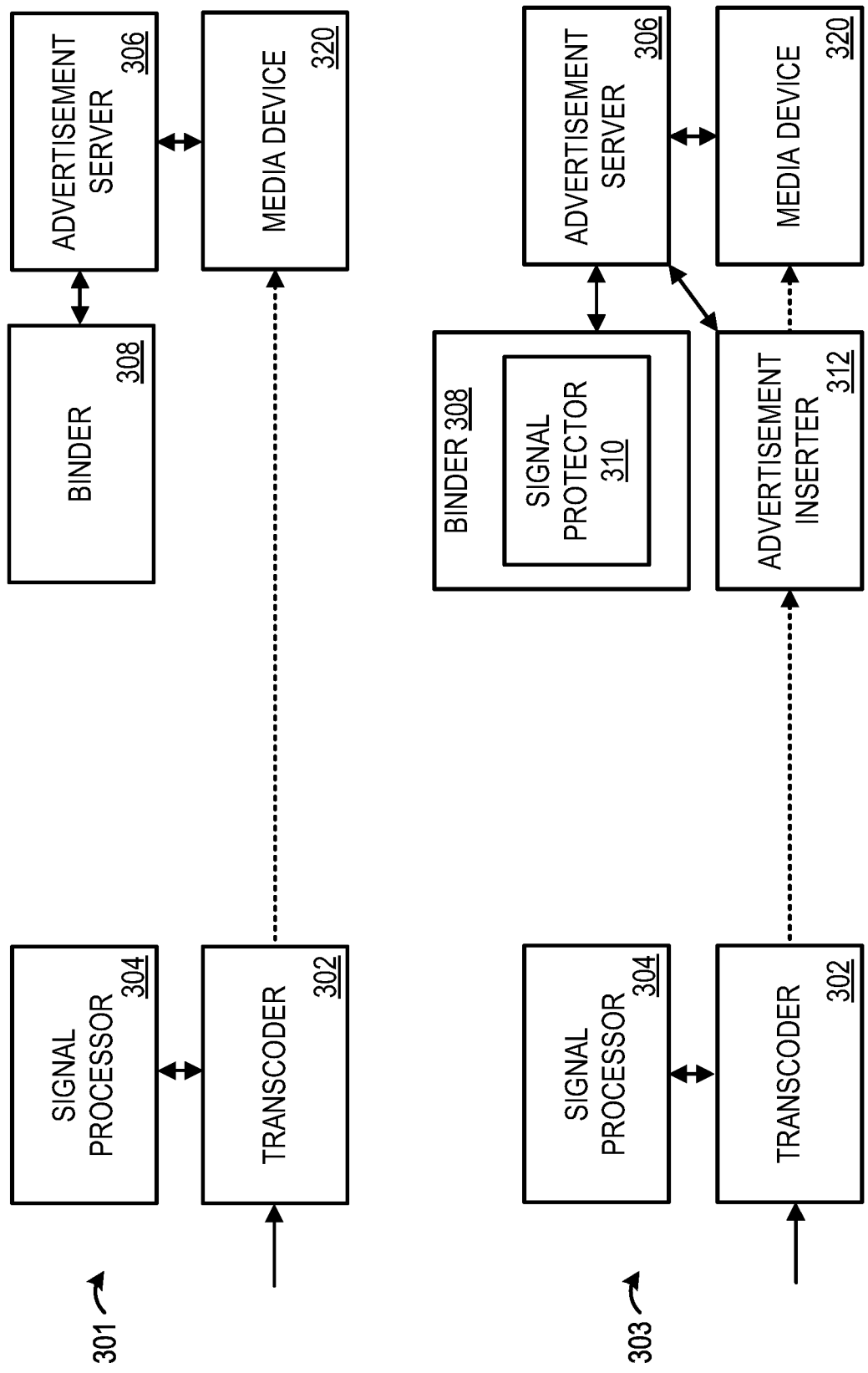
FIG. 3 shows example systems for content management.

FIG. 3 shows an example content distribution system 301. In an early binding configuration, a transcoder 302 may receive content comprising the one or more markers and may relay the one or more markers to a signal processor 304. The signal processor 304 may be the signal device 104 of FIG. 1. The signal processor 304 may generate a marker ID and send marker ID through the transcoder to the media device 320. The media device 120 may receive the marker ID and send the marker ID to an advertisement server 306 which may forward the marker ID to a signal binder 308. The signal binder 308 may receive the marker ID and may bind the marker ID to an advertisement break ID associated with an advertisement schedule in a database. The signal binder 308 may send the bound marker ID and advertisement break ID to back to the advertisement server. Thus, if the advertisement server 306 receives an advertisement request comprising the marker ID, the advertisement server 306 may determine which advertisement to serve in response to the advertisement request.

In late binding configuration 301, the transcoder 302 may receive the content comprising the one or more markers and may relay the one or more markers to the signal processor 304. The signal processor 304 may be the signal device 104 of FIG. 1. The signal processor 304 may generate a marker ID and send the marker ID back to the transcoder for forwarding to the media device 320 along with the content comprising the one or more markers. The media device 320 may receive the content comprising the one or more markers and the marker ID. The media device 320 may determine, based on the marker that an advertisement break is inbound (e.g., in the next 1 or 2 seconds). The media device 320 may send an advertisement request to the advertisement server 306. The advertisement request may comprise at least one of the marker ID, the content ID, a timestamp, and/or the media device ID. The advertisement server 306 may receive the advertisement request and determine the marker ID and the timestamp. The advertisement server 306 may query a database to determine a previously bound marker ID and advertisement break and thereby determine the presently received marker ID is associated with the next unbound advertisement break. The advertisement server 306 may forward, to the binder 308, the marker ID and the advertisement break ID. The binder 308, after receiving one or more marker IDs, may bind the marker ID to the advertisement break ID.

In late binding configuration 303, the transcoder 302 may receive the content comprising the one or more markers and may relay the one or more markers to the signal processor 304. The signal processor 304 may be the signal device 104 of FIG. 1. The signal processor 304 may generate a marker ID and send the marker ID back to the transcoder for forwarding to the media device 320 along with the content comprising the one or more markers. Before the content comprising the one or more markers reaches the media device 320, the content comprising the one or more markers may be received by an advertisement inserter 312. The advertisement inserter 312 may determine a marker of the one or more markers as well as the associated marker ID. The advertisement inserter 312 may send, to the advertisement server 306, the marker ID. The advertisement server 306 may receive the marker ID and forward the marker ID to the binder 308. The binder 308 may comprise a signal protector 310. The signal protector 310 may be configured to receive information associated with the advertisement request. The signal protector 310 may be configured to receive information associated with the plurality of advertisement requests. For example, the signal protector 310 may receive at least one marker ID from the advertisement server 306. The signal protector 310 may be configured to determine information about the plurality of advertisement requests. For example, the signal protector 310 may be configured to receive a plurality of marker IDs associated with the plurality of advertisement requests. For example, the signal protector 310 may be configured to determine a number of advertisement requests comprising the same marker ID. This process may be repeated (e.g., happen simultaneously) in a plurality of networks associated with a plurality of media devices. Thus, the signal protector 310 may receive a first marker ID associated with a first timestamp and one or more subsequent marker IDs associated with one or more subsequent timestamps. The one or more subsequent marker IDs may be the same as the first marker ID. The signal protector 310 may determine that, within a given period of time, a threshold quantity of marker IDs of the one or more subsequent markers IDs are the same and thus determine that the marker ID is legitimate (e.g., generated by the signal processor 304 as opposed to an outside party or due to error) and proceed to bind the marker ID to the advertisement break ID.

Figure 4:
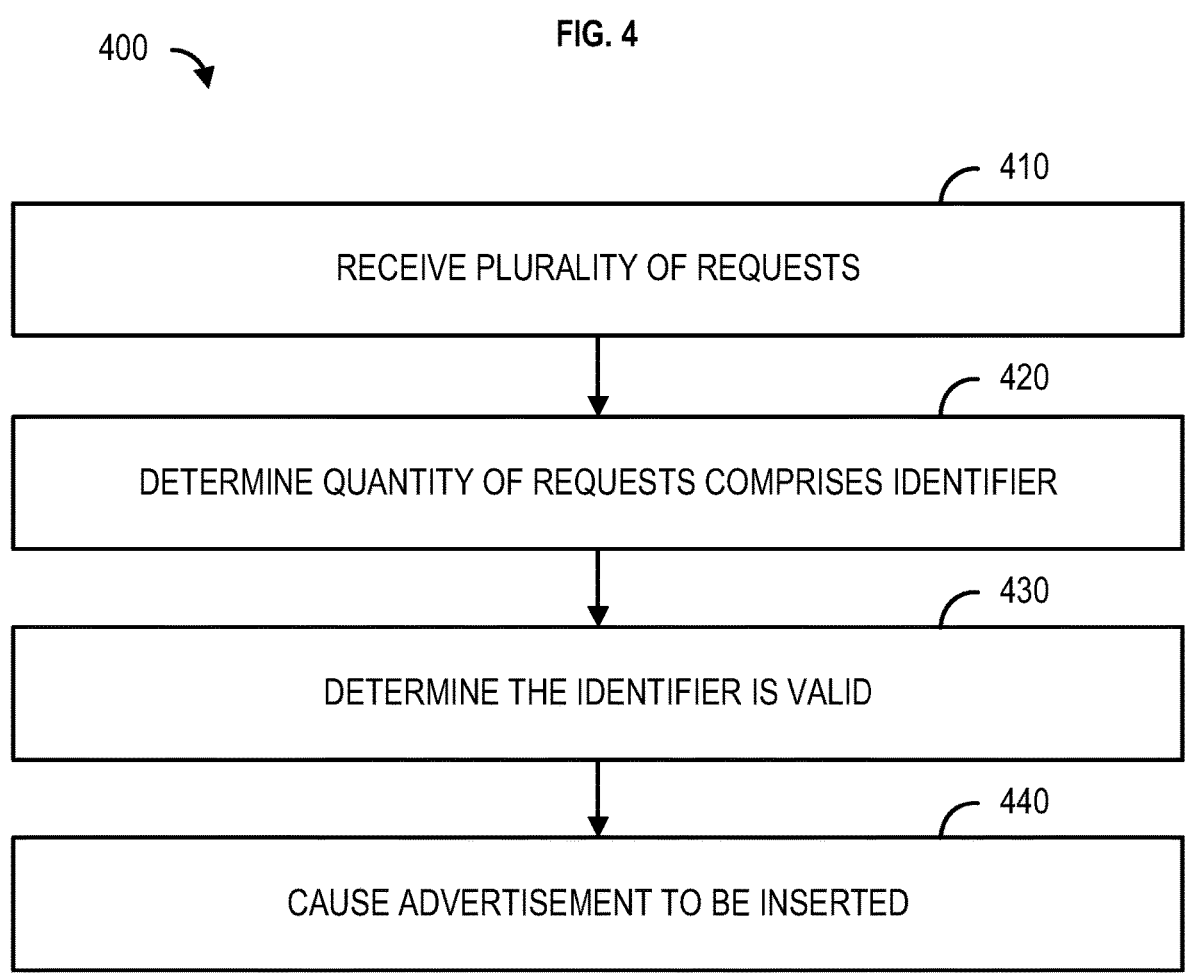
FIG. 4 shows a flowchart of an example method for content management.

FIG. 4 shows a flowchart of a method 400 for content management. At step 410, a plurality of requests for advertisement content may be received by a computing device. For example, the computing device may comprise an advertisement server, content server, or other content source. The plurality of requests may be sent by a plurality of media devices. For example, the plurality of media devices may comprise at least one of: a plurality of set-top-boxes, a plurality of smart phones, or a plurality of personal computers.

At step 420, it may be determined that a quantity of requests of the plurality of requests comprises a content insertion point identifier associated with a content insertion point. The content insertion point identifier may be generated by a transcoder or packager or other similar hardware or software upstream of the plurality of media devices. Content being sent to the plurality of media devices may comprise the content insertion point. For example, the content insertion point may comprise an insertion opportunity in a content stream such as a splice-in or splice-out event. The content insertion point identifier may be a unique identifier associated with the content insertion point. For example, the content insertion identifier may comprise a string of characters or bits. The plurality of media devices may be configured to receive a marker such as a SCTE-35 marker comprising the content insertion point identifier. Based on received the content insertion point identifier, the plurality media devices may be configured to populate a field in the plurality of requests for advertisement content, with the content insertion point identifier.

At step 430, it may be determined that the content insertion point identifier is valid. Determining that the content insertion point identifier is valid may comprise determining that the content insertion point identifier is not a result of a network error, a hardware error, a software error, or a malicious attack. The determination that the content insertion point identifier is valid may be based on a determination that the quantity of requests comprising the content insertion point identifier satisfies a threshold. For example, the threshold may indicate that the quantity of requests comprising the content insertion point identifier is a percentage of total requests, some of which may or may not comprise the content insertion point identifier. For example, the request threshold may comprise a 90 percent threshold. That is to say, 90 percent of total received requests must comprise the content insertion point identifier in order to satisfy the threshold. For example, if the quantity of requests comprises 6000 requests for advertisement content out of a total of 6010 received requests for advertisement content, the request threshold would be satisfied.

At step 440, at least one advertisement may be caused to be inserted at the content insertion point in the content sent to the plurality of media devices. Causing the at least one advertisement to be inserted may be based on determining that the content insertion point identifier is valid. Causing the at least one advertisement to be sent may comprise determining an advertisement schedule associated with a syscode. Causing the at least one advertisement to be inserted may comprise querying a database to determine a previously bound advertisement break (e.g., an advertisement break that is associated with a previous content insertion point identifier). Causing the at least one advertisement to be sent may comprise determining, based on the previously bound advertisement break, a next unbound advertisement break. The next unbound advertisement break may be associated with the at least one advertisement. For example, the next unbound advertisement break may be associated with a plurality of advertisements including the at least one advertisement.

The method may comprise sending, based on the content insertion point identifier being valid, a message wherein the message is configured to cause an association between an advertisement break identifier and the content insertion point identifier. The method may further comprise determining, based on an advertisement break identifier, a timeslot comprising the at least one advertisement and sending the at least one advertisement to the plurality of media devices. The method may further comprise determining an advertisement break associated with the content insertion point identifier and indicating, based on sending the at least one advertisement to the plurality of media devices, the advertisement break has been fulfilled. The method may further comprise determining, based on the content insertion point identifier, a first syscode associated with a first advertisement break and a second syscode associated with a second advertisement break, sending, based on the first syscode, a first advertisement to a first quantity of media devices, and sending, based on the second syscode, a second advertisement to a second quantity of media devices.

Figure 5:
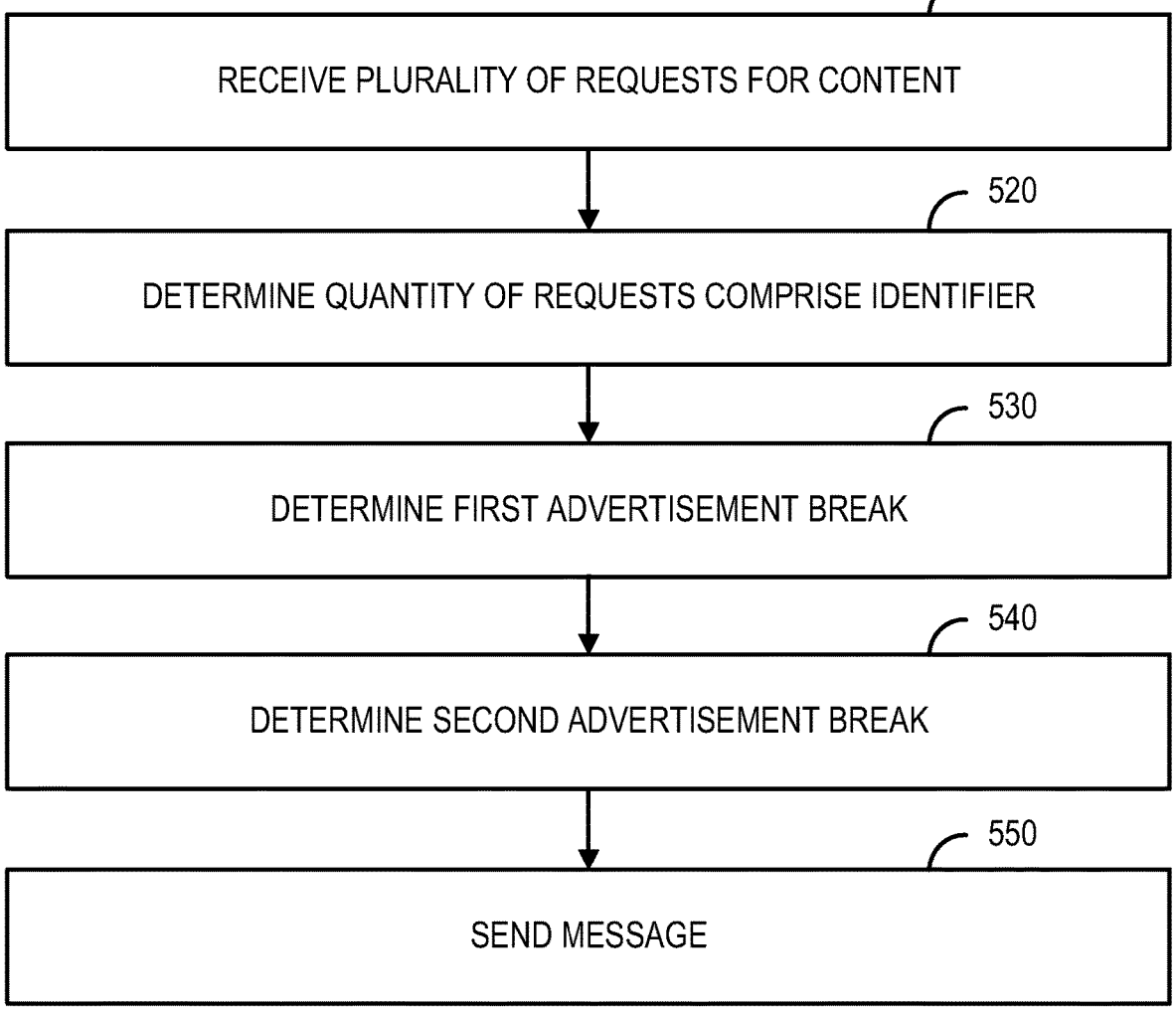
FIG. 5 shows a flowchart of an example method for content management.

FIG. 5 shows a flowchart of a method 500 for content management. At step 510, a plurality of requests for advertisement content may be received by a computing device. For example, the computing device may comprise an advertisement server, content server, or other content source. The plurality of requests may be sent by a plurality of media devices. For example, the plurality of media devices may comprise at least one of: a plurality of set-top-boxes, a plurality of smart phones, a plurality of personal computers, a plurality of streaming media devices, combinations thereof, and the like.

At 520, it may be determined that a threshold quantity of requests of the plurality of requests comprise a content insertion point identifier. The content insertion point identifier may be associated with a content insertion point in content sent to the plurality of media devices. For example, the threshold may indicate that the quantity of requests comprising the content insertion point identifier is a percentage of total requests, some of which may or may not comprise the content insertion point identifier. For example, the request threshold may comprise a 90 percent threshold. That is to say, 90 percent of total received requests must comprise the content insertion point identifier in order to satisfy the threshold. For example, if the quantity of requests comprises 6000 requests for advertisement content out of a total of 6010 received requests for advertisement content, the request threshold would be satisfied.

At 530, a first advertisement break identifier associated with a previous content insertion point identifier. For example, a database may be queried. The database may comprise an advertisement schedule. The advertisement schedule may comprise a plurality of advertisement breaks and associated advertisement break identifiers. Each advertisement break of the plurality of advertisement breaks may be associated with a timeslot. For example, the first advertisement break may be associated with the 1:00 PM to 2:00 PM hour. Each advertisement break of the plurality of advertisement breaks may be associated with a geographic region (indicated, for example, by a syscode). Each advertisement break of the plurality of advertisement breaks may also be associated with a plurality of advertisements.

At 540, a second advertisement break identifier associated with a current advertisement break may be determined. Determining the second advertisement break may comprise determining an advertisement break which is sequentially or temporally "next" (for any given syscode) after the first advertisement break identifier in the advertisement schedule.

At 550, a message configured to cause an association between the second advertisement break identifier and the content insertion point identifier may be sent. For example, the message may cause the database to update by population a field associated with the current advertisement break with the content insertion point identifier.

The method may comprise determining that the content insertion point is valid. Determining that the content insertion point identifier is valid may comprise determining that the content insertion point identifier is not a result of a network error, a hardware error, a software error, or a malicious attack. The method may comprise causing at least one advertisement to be inserted at the content insertion point in the content sent to the plurality of media devices. The method may comprise determining, based on an advertisement break identifier in the advertisement schedule, a timeslot comprise the at least one advertisement and sending the at least one advertisement.

FIG. 6 shows a flowchart of a method 600 for content management. At step 610, a plurality of requests for advertisement content may be received. The plurality of requests for advertisement content may be received by a computing device. For example, the computing device may comprise an advertisement server, content server, or other content source. The plurality of requests for advertisement content may be received from a first plurality of media devices. For example, the first plurality of media devices may comprise at least one of: a plurality of set-top-boxes, a plurality of smart phones, a plurality of personal computers, a plurality of streaming media devices, combinations thereof, and the like. Each request for advertisement content of the plurality of requests for advertisement content from the first plurality of media devices may comprise a device identifier associated with a respective media device. Each request for advertisement content of the first plurality of requests for advertisement content may comprise a content insertion point identifier. The plurality of media devices may be configured to receive a marker (e.g., from a content source or some other upstream component such as an encoder, packager, signal handler, etc.) comprising the content insertion point identifier. For example, each media device of the first plurality of media devices may be configured to receive an SCTE-35 marker comprising the content insertion point identifier, determine the content insertion point identifier, incorporate the content insertion point identifier into a request for advertisement content, and send the request for advertisement content to the computing device.

At step 620, the computing device may receive a request for advertisement content. The content for advertisement content may be received from an edge device such as a VDE. The edge device may be in communication with (or otherwise associated with) a second plurality of media devices. For example, the VDE may be configured to communicate with (e.g., service) a quantity of media devices (e.g., a quantity of set-top-boxes). The quantity of media devices may, for example, be located in a geographic area and may be associated with a syscode (or some other geographic identifier). The edge device may receive a second plurality of requests for advertisement content. For example, each of the media devices of the second plurality of media devices may send, to the edge device a respective request for the advertisement content. The edge device may receive the second plurality of requests and, on behalf of the second plurality of media devise, send to the computing device, a single request for advertisement content.

At step 630, it may be determined that a quantity of requests for the advertisement content comprises a content insertion point identifier associated with a content insertion point in content sent to the first plurality of media devices and the second plurality of media devices. The quantity of requests for the advertisement may comprise all or a portion of the plurality of requests for advertisement from the first plurality of media devices and the request for the advertisement content from the edge device. For example, if the first plurality of media devices comprises 5,000 media devices and the second plurality of media devices (which sent their respective requests to the edge device) comprises 1,000 media devices, the quantity of requests may comprise 5,001 requests.

At step 640, it may be determined that the content insertion point identifier is valid. The determination that content insertion point identifier is valid may be based on the quantity of requests satisfying a threshold. For example, the threshold may be comprise a certain number of requests, or a percentage of requests of a total of received requests. For example, the threshold may indicate that the quantity of requests comprising the content insertion point identifier is a percentage of total requests, some of which may or may not comprise the content insertion point identifier. For example, the request threshold may comprise a 90 percent threshold. That is to say, 90 percent of total received requests must comprise the content insertion point identifier in order to satisfy the threshold. For example, if the quantity of requests comprises 5001 requests for advertisement content out of a total of 5010 received requests for advertisement content, the request threshold would be satisfied. Determining that the content insertion point identifier is valid may comprise determining that the content insertion point identifier is not a result of a network error, a hardware error, a software error, or a malicious attack.

At step 650, at least one advertisement may be caused to be inserted at the content insertion point in the content sent to the first plurality of media devices and the second plurality of media devices. For example, a database may be queried. The database may comprise an advertisement schedule. The advertisement schedule may comprise a plurality of advertisement breaks and associated advertisement break identifiers. Each advertisement break of the plurality of advertisement breaks may be associated with a timeslot. For example, the first advertisement break may be associated with the 1:00 PM to 2:00 PM hour. Each advertisement break of the plurality of advertisement breaks may be associated with a geographic region (indicated, for example, by a syscode). Each advertisement break of the plurality of advertisement breaks may also be associated with a plurality of advertisements. Causing the at least one advertisement to be inserted may comprise determining, based on a previously bound advertisement break, a next unbound advertisement break. The next unbound advertisement break may be associated with the at least one advertisement. For example, the next unbound advertisement break may be associated with a plurality of advertisements including the at least one advertisement.

The method may comprise determining that the content insertion point identifier is valid by determining a first request value associated with the plurality of requests for advertisement content from the first plurality of media devices. The method may comprise determining that the content insertion point identifier is valid by determining a second request value associated with the request for advertisement content from the edge device, wherein the second request value associated with the request for advertisement content is associated with the second plurality of media devices. The method may further comprise determining, based on the first request value and the second request value, a total request value that satisfies the threshold. The method may comprise determining an advertisement break associated with the content insertion point identifier indicating, based on causing the at least one advertisement to be inserted, the advertisement break has been fulfilled. The method may comprise determining, based on an advertisement break identifier, a timeslot comprising the at least one advertisement and sending the at least one advertisement to the first plurality of media devices and the edge device. The method may comprise sending, based on determining that the content identifier is valid, a message wherein the message is configured to cause an association between the an advertisement break identifier and the content insertion point identifier.

Figure 7:
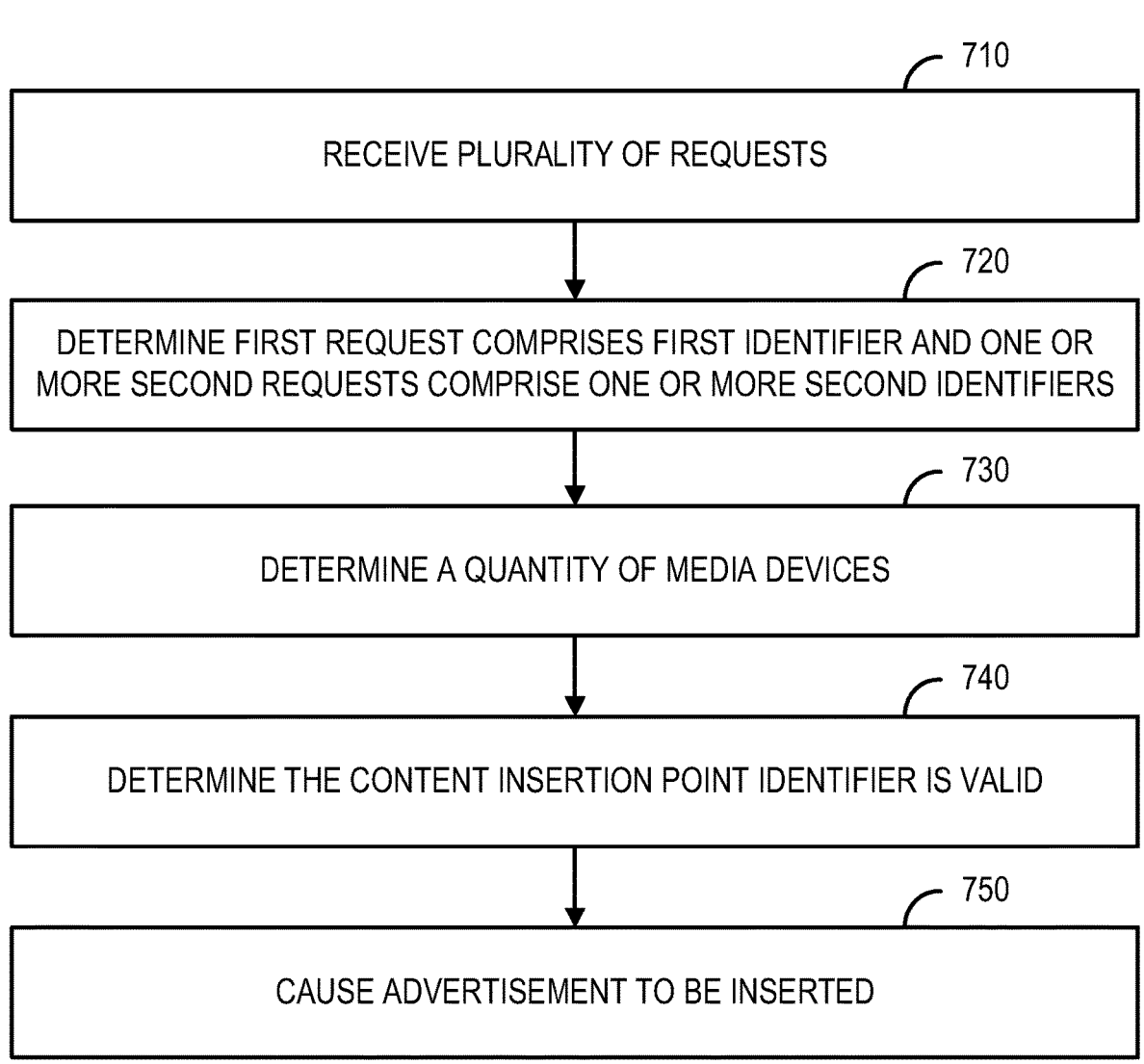
FIG. 7 shows a flowchart of an example method for content management.

FIG. 7 shows a flowchart of a method 700 for content management. At 710, a plurality of requests for advertisement content may be received by a computing device. For example, the computing device may comprise an advertisement server, content server, or other content source. The plurality of requests may be sent by a plurality of media devices. For example, the plurality of media devices may comprise at least one of: a plurality of set-top-boxes, a plurality of smart phones, a plurality of personal computers, a plurality of streaming media devices, combinations thereof, and the like.

At 720, it may be determined that a first request of the plurality of requests comprises a first identifier and one or more second requests of the plurality of requests comprise one or more second device identifiers. The first identifier may be, for example, a computing device identifier (e.g., an Internet Protocol (IP) address, a Media Access Control (MAC) address, a device name, a device type, etc.). The one or more second identifiers may be, for example, one or more media device identifiers (e.g., an Internet Protocol (IP) address, a Media Access Control (MAC) address, a device name, a device type, etc.). The computing device identifier may be associated (e.g., in a database) with a computing device and a list of media device identifiers. For example, the computing device may comprise an edge device, such as a VDE, that serves one or more media devices in a geographic area. For example, the computing device identifier and the one or more media device identifiers may all share a syscode (e.g., an indication of a geographic region like Boston or New York City).

At 730, a quantity of media devices associated with the computing device may be determined. For example, the computing device may comprise an edge device, such as a VDE, and the one or more media devices may comprise one or more of: one or more set-top-boxes, one or more smart phones, one or more personal computers, one or more streaming media devices, combinations thereof, and the like. For example, the computing device identifier may be associated in the database with a list of media devices (e.g., STBs). For example, the list may comprise a list of MAC addresses or other media device identifiers. For example, the advertisement server may receive the request from the VDE, query a database with the computing device identifier, and the database may indicate that the VDE is associated with 1,000.

At 740, it may be determined that the content insertion point identifier is valid. Determining that the content insertion point identifier is valid may comprise determining that the content insertion point identifier is not a result of a network error, a hardware error, a software error, or a malicious attack. Determining that the content insertion point identifier is valid may be based on the quantity of media devices associated with the computing device identifier and the one or more second requests satisfying a threshold. The threshold may indicate that a certain percentage of total requests comprise the content insertion point identifier. For example, the request threshold may comprise a 90 percent threshold. That is to say, 90 percent of total received requests must comprise the content insertion point identifier in order to satisfy the threshold. For example, if the sum of the quantity of media devices associated with the computing device and the one or more second requests equals 6000 requests for advertisement content out of a total of 6010 received requests for advertisement content, the request threshold would be satisfied.

At 750, at least one advertisement may be caused to be inserted at the content insertion point. Causing the at least one advertisement to be inserted may be based on determining that the content insertion point identifier is valid. For example, upon determining that the content insertion point identifier is valid, the at least one advertisement may be caused to be inserted. Causing the at least one advertisement to be sent may comprise determining an advertisement schedule associated with a syscode. Causing the at least one advertisement to be sent may comprise querying a database to determine a previously bound advertisement break (e.g., an advertisement break that is associated with a previous content insertion point identifier). Causing the at least one advertisement to be inserted may comprise determining, based on the previously bound advertisement break, a next unbound advertisement break. The next unbound advertisement break may be associated with the at least one advertisement. For example, the next unbound advertisement break may be associated with a plurality of advertisements including the at least one advertisement.

The method may comprise determining that the content insertion point identifier is valid by at least one of determining that the content insertion point identifier is not a result of a network error or determining that the content insertion point identifier is not a result of a malicious attack. The method may comprise determining the quantity of media devices associated with the computing device identifier comprises by sending a query comprising the computing device identifier and determining, based on the query, a list of MAC addresses associated with the computing device.

Figure 8:
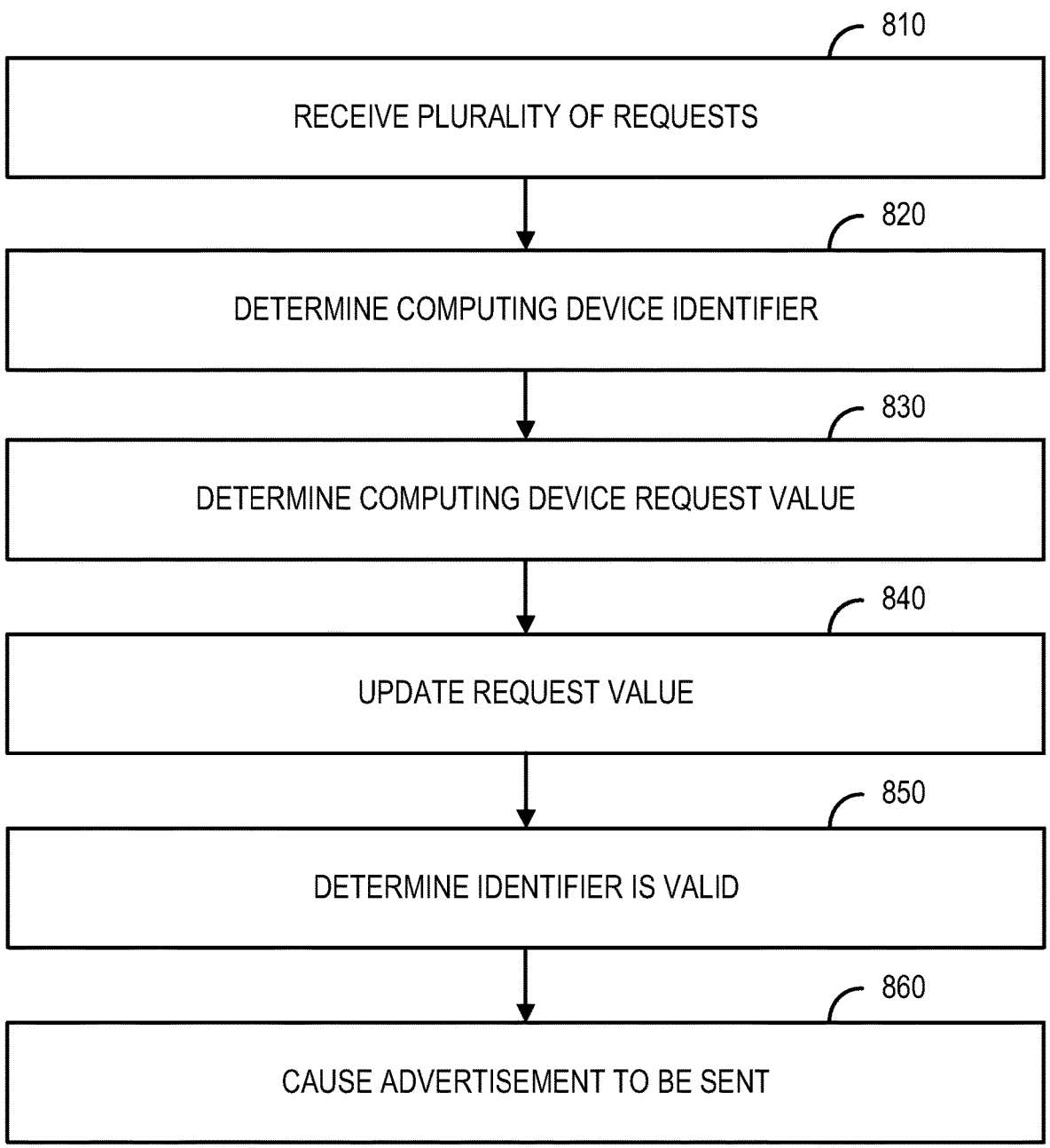
FIG. 8 shows a flowchart of an example method for content management.

FIG. 8 shows an example method 800. At step 810, a plurality of requests for advertisement content may be received by a computing device. For example, the computing device may comprise an advertisement server, content server, or other content source. The plurality of requests may be sent by a plurality of media devices. For example, the plurality of media devices may comprise at least one of: a plurality of set-top-boxes, a plurality of smart phones, a plurality of personal computers a plurality of streaming media devices, combinations thereof, and the like. The plurality of requests may be associated with a request value.

At 820, it may be determined that a first request for advertisement content comprises a computing device identifier and a second one or more requests for advertisement content may comprise one or more media device identifiers. The request value may indicate the number of requests received. For example, if a computing device sends the first request for advertisement content comprising the computing device identifier and five hundred media devices send 5000 requests for advertisement content, the total number of requests received would be 5001 and thus the request value would be 5001.

At 830, a computing device request value may be determined. The computing device request value may comprise a number of media devices associated with the computing device. For example, the computing device request value may indicate that the computing device (e.g., the VDE) serves 100 media devices (e.g., 100 STBs). Determining that the computing device is associated with the number of media devices may comprise querying a database. For example, the computing device may be associated with a syscode, or a geographic region populated by the number of media devices. For example, a service provider such as internet service provider or a television service provider may maintain a databse comprising an association between the computing device and the one or more media devices.

At step 840, the request value may be updated. The request value may be updated based on the computing device request value. For example, the request value may, before determining the computing device request value, be 5001 representing the 500 requests from individual media devices and the one request from the computing device. However, after determining that the computing device is associated with 1000 media devices, thus the updated request value may reflect the 6000 total requests.

At 850, it may be determined that the content insertion point identifier is valid. Determining that the content insertion point identifier is valid may comprise determining that the content insertion point identifier is not a result of a network error, a hardware error, a software error, or a malicious attack. The determination that the content insertion point identifier is valid may be based on a determination that the updated request value satisfies a request threshold. The threshold may indicate that a certain percentage of total requests comprise the content insertion point identifier. For example, the request threshold may comprise a 90 percent threshold. That is to say, 90 percent of total received requests must comprise the content insertion point identifier in order to satisfy the threshold. For example, if the updated request value represents 6000 requests for advertisement content out of a total of 6010 received requests for advertisement content, the request threshold would be satisfied.

At 860, at least one advertisement may be caused to be sent. Causing the at least one advertisement to be sent may be based on determining that the content insertion point identifier is valid. For example, upon determining that the content insertion point identifier is valid, the at least one advertisement may be caused to be sent. Causing the at least one advertisement to be sent may comprise determining an advertisement schedule associated with a syscode. Causing the at least one advertisement to be sent may comprise querying a database to determine a previously bound advertisement break (e.g., an advertisement break that is associated with a previous content insertion point identifier). Causing the at least one advertisement to be sent may comprise determining, based on the previously bound advertisement break, a next unbound advertisement break. The next unbound advertisement break may be associated with the at least one advertisement. For example, the next unbound advertisement break may be associated with a plurality of advertisements including the at least one advertisement.

Figure 9:
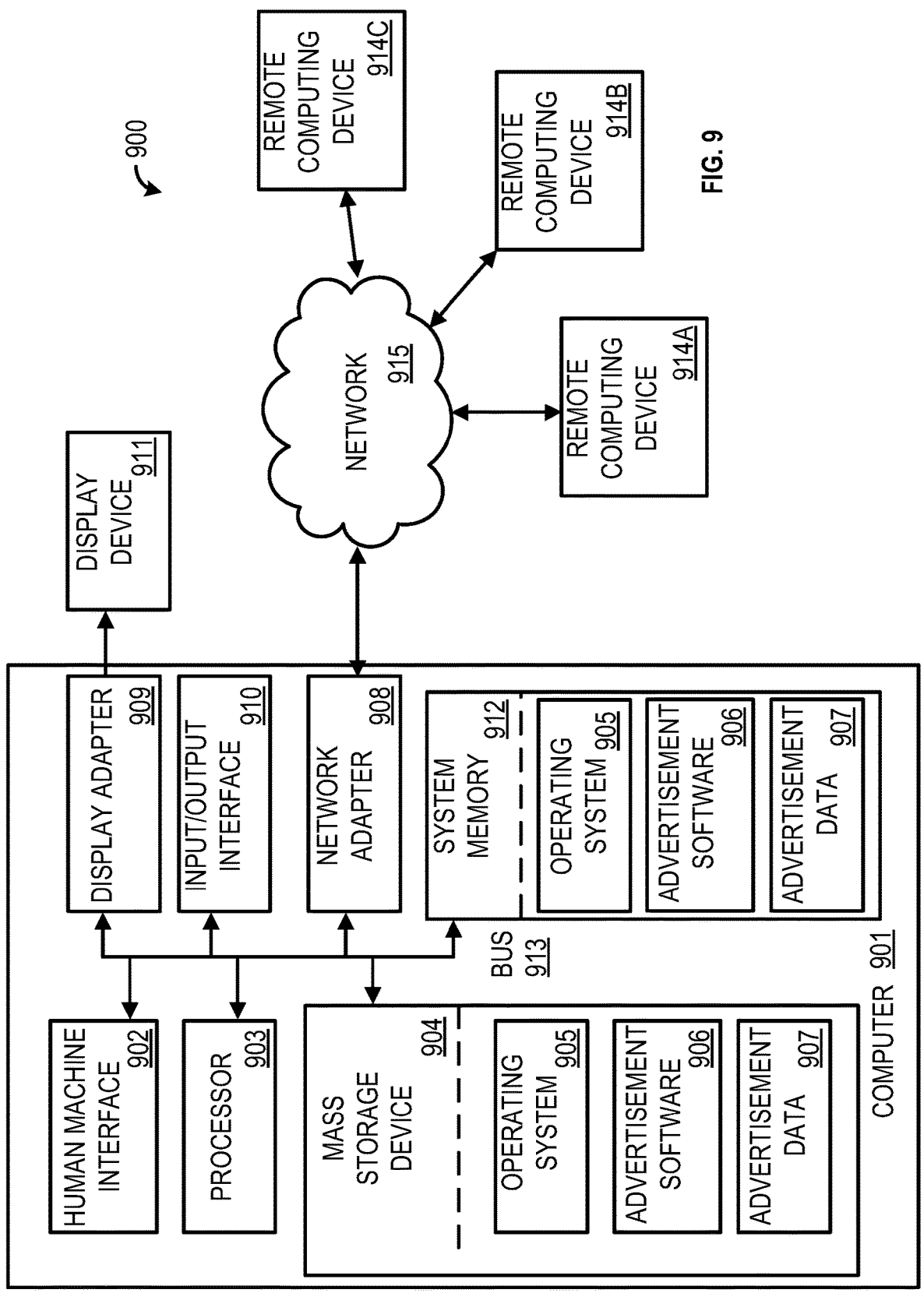
FIG. 9 shows an example block diagram of a system for content management.

FIG. 9 shows a system 900 for content management. The media device 120, the display device 121, the communication terminal 122, the mobile device 124, the advertisement server 106, the content source 102, the signal device 102, and/or the network component 129 of FIG. 1 may be a computer 901 as shown in FIG. 9. The user device 202, the network device 204, the content device 206, and/or the computing device 208 of FIG. 2 may be a computer 801 as shown in FIG. 9. The computer 901 may comprise one or more processors 703, a system memory 912, and a bus 913 that couples various system components including the one or more processors 903 to the system memory 912. In the case of multiple processors 903, the computer 901 may utilize parallel computing. The bus 913 is one or more of several possible types of bus structures, including a memory bus or memory controller, a peripheral bus, an accelerated graphics port, or local bus using any of a variety of bus architectures.

The computer 901 may operate on and/or comprise a variety of computer readable media (e.g., non-transitory). The readable media may be any available media that is accessible by the computer 901 and may comprise both volatile and non-volatile media, removable and non-removable media. The system memory 912 has computer readable media in the form of volatile memory, such as random access memory (RAM), and/or non-volatile memory, such as read only memory (ROM). The system memory 912 may store data such as the advertisement data 907 and/or program modules such as the operating system 905 and the advertisement software 906 that are accessible to and/or are operated on by the one or more processors 903. The machine learning module may comprise one or more of the advertisement data 907 and/or the advertisement software 906.

The computer 901 may also comprise other removable/non-removable, volatile/non-volatile computer storage media. FIG. 9 shows the mass storage device 904 which may facilitate non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 904, such as the operating system 905 and the advertisement software 906. Each of the operating system 905 and the advertisement software 906 (or some combination thereof) may comprise elements of the program modules and the advertisement software 906. The advertisement data 907 may also be stored on the mass storage device 904. The advertisement data 907 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 915.

A user may enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

The display device 911 may also be connected to the bus 913 via an interface, such as the display adapter 909. It is contemplated that the computer 901 may comprise more than one display adapter 909 and the computer 901 may comprise more than one display device 911. The display device 911 may be a monitor, an LCD (Liquid Crystal Display), light emitting diode (LED) display, television, smart lens, smart glass, and/or a projector. In addition to the display device 911, other output peripheral devices may be components such as speakers (not shown) and a printer (not shown) which may be connected to the computer 901 via the Input/Output Interface 910. Any step and/or result of the methods may be output (or caused to be output) in any form to an output device. Such output may be any form of visual representation, including, but not limited to, textual, graphical, animation, audio, tactile, and the like. The display device 911 and computer 901 may be part of one device, or separate devices.

The computer 901 may operate in a networked environment using logical connections to one or more remote computing devices 914A,B,C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 901 and a remote computing device 914A,B,C may be made via a network 915, such as a local area network (LAN) and/or a general wide area network (WAN). Such network connections may be through the network adapter 908. The network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the one or more processors 903 of the computer. An implementation of the predicting software 906 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the quantity or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a computing device, a plurality of requests for second content from a plurality of media devices;
determining, based on the plurality of requests, that a threshold quantity of requests of the plurality of requests comprises a content insertion point identifier associated with a content insertion point in first content sent to the plurality of media devices;
determining, based on the threshold quantity of requests comprising the content insertion point identifier, that the content insertion point identifier is valid; and
based on determining the content insertion point identifier is valid, inserting the second content at the content insertion point in the first content sent to the plurality of media devices.

2. The method of claim 1, wherein the plurality of media devices comprise at least one of: a plurality of set-top-boxes, a plurality of smart phones, or a plurality of personal computers.

3. The method of claim 1, wherein the threshold quantity of requests comprises a percentage of the plurality of requests.

4. The method of claim 1, further comprising:
sending a message wherein the message is configured to cause an association between a content break identifier and the content insertion point identifier.

5. The method of claim 1, wherein inserting the second content comprises:
determining, based on a content break identifier, a timeslot comprising the second content; and
sending the second content to the plurality of media devices.

6. The method of claim 5, further comprising:
determining a content break associated with the content insertion point identifier; and
indicating, based on sending the second content to the plurality of media devices, the content break has been fulfilled.

7. The method of claim 1, further comprising
determining, based on the content insertion point identifier, a first syscode associated with a first content break and a second syscode associated with a second content break;
sending, based on the first syscode, the first content to a first quantity of media devices of the plurality of media devices; and
sending, based on the second syscode, the second content to a second quantity of media devices of the plurality of media devices.

8. The method of claim 1, wherein at least one request of the plurality of requests is from a distribution device, wherein the distribution device comprises one or more of: a video delivery edge device, a gateway device, a head end device, or an access point.

9. A method comprising:
receiving a threshold quantity of requests comprising a content insertion point identifier associated with a content insertion point in content sent to a plurality of media devices;
determining, based on the threshold quantity of requests, that the content insertion point identifier is valid;
determining a first content break identifier associated with a previous content insertion point identifier;
determining, based on the first content break identifier, a second content break identifier associated with a second content break;
sending a message configured to cause an association between the second content break identifier and the content insertion point identifier, wherein the association indicates that the plurality of media devices encountered the second content break; and
inserting, based on the content insertion point identifier, secondary content.

10. The method of claim 9, wherein the plurality of media devices comprise at least one of: a plurality of set-top-boxes, a plurality of smart phones, or a plurality of personal computers.

11. The method of claim 9, wherein the threshold quantity of requests comprises a percentage of a plurality of requests for content.

12. The method of claim 9, wherein determining the first content break identifier comprises querying a database to determine a previously bound break identifier.

13. The method of claim 9, further comprising determining based on the threshold quantity of requests comprising the content insertion point identifier, that the content insertion point is valid.

14. The method of claim 13, further comprising:
sending the secondary content to the plurality of media devices.

15. The method of claim 14, wherein inserting the secondary content at the content insertion point comprises:
determining, based on the second content break identifier, a timeslot associated with the content; and
sending the content to the plurality of media devices.

16. The method of claim 9, wherein the second content break comprises a current content break.

17. A method comprising:
receiving, by a computing device, a plurality of requests for second content from a first plurality of media devices;
receiving, by the computing device, a request for the second content from a distribution device associated with a second plurality of media devices;
determining, based on the plurality of requests for the second content from the first plurality of media devices and the request for the second content from the distribution device, that a threshold quantity of requests for the second content comprises a content insertion point identifier associated with a content insertion point in first content sent to the first plurality of media devices and the second plurality of media devices;
determining, based on the threshold quantity of requests comprising the content insertion point identifier, that the content insertion point identifier is valid; and
inserting, based on the content insertion point identifier being valid, at the content insertion point in the first content sent to the first plurality of media devices and the second plurality of media devices, the second content.

18. The method of claim 17, wherein the first plurality of media devices and the second plurality of media devices comprise at least one of: a plurality of set-top-boxes, a plurality of smart phones, or a plurality of personal computers.

19. The method of claim 17, wherein determining that the content insertion point identifier is valid comprises:
determining a first request value associated with the plurality of requests for second content from the first plurality of media devices;
determining a second request value associated with the request for second content from the distribution device, wherein the second request value associated with the request for second content is associated with the second plurality of media devices; and
determining, based on the first request value and the second request value, a total request value that satisfies a threshold.

20. The method of claim 17, further comprising:
determining a content break associated with the content insertion point identifier; and
indicating, based on causing the second content to be inserted, the content break has been fulfilled.

21. The method of claim 17, wherein inserting the second content comprises:
determining, based on a content break identifier, a timeslot comprising the second content; and
sending the second content to the first plurality of media devices and the distribution device.

22. The method of claim 17, further comprising:
based on determining that the content insertion point identifier is valid, sending a message, wherein the message is configured to cause an association between a content break identifier and the content insertion point identifier.

23. The method of claim 17, wherein the distribution device comprises one or more of: a video delivery edge device, a gateway device, a head end device, or an access point.

\* \* \* \* \*